(12) United States Patent
Almazán Campillay et al.

(10) Patent No.: US 9,562,585 B2
(45) Date of Patent: Feb. 7, 2017

(54) VIBRATION-INSULATING DEVICE AND SYSTEM

(71) Applicant: PONTIFICIA UNIVERSIDAD CATOLICA DE CHILE, Santiago (CL)

(72) Inventors: José Luis Almazán Campillay, Santiago (CL); Victor Manuel Sandoval Sanzana, Santiago (CL); Andrés Arturo González Cornejo, Santiago (CL)

(73) Assignee: Pontificia Universidad Catolica de Chile, Santiago (CL)

( * ) Notice: Subject to any disclaimer, the term of this patent is extended or adjusted under 35 U.S.C. 154(b) by 117 days.

(21) Appl. No.: 14/382,127

(22) PCT Filed: Feb. 26, 2013

(86) PCT No.: PCT/CL2013/000016
§ 371 (c)(1),
(2) Date: Aug. 29, 2014

(87) PCT Pub. No.: WO2013/127018
PCT Pub. Date: Sep. 6, 2013

(65) Prior Publication Data
US 2015/0048234 A1 Feb. 19, 2015

(30) Foreign Application Priority Data
Feb. 29, 2012 (CL) .................................. 552-2012

(51) Int. Cl.
*F16F 15/02* (2006.01)
*E04H 9/02* (2006.01)
*F16F 13/00* (2006.01)

(52) U.S. Cl.
CPC ............... *F16F 13/00* (2013.01); *E04H 9/021* (2013.01); *F16F 15/022* (2013.01)

(58) Field of Classification Search
CPC .............. F16F 7/04; F16F 7/104; F16F 15/04; F16F 13/00; F16F 15/022; E04H 9/021
(Continued)

(56) References Cited

U.S. PATENT DOCUMENTS 7,774,996 B2 * 8/2010 Mualla .................... E01D 11/04
248/560

FOREIGN PATENT DOCUMENTS

DE 468994 * 12/1928 ............. F16F 15/04
JP H10-280660 * 10/1998 ............. E04H 9/021
(Continued)

*Primary Examiner* — Michael Safavi
(74) *Attorney, Agent, or Firm* — Ladas & Parry LLP

(57) ABSTRACT

Device for three-dimensional vibration insulation between structures or industrial equipment in general and the foundations thereof, comprising a hexagonal framework formed by six plates connected so as to pivot in relation to each other by horizontal parallel hinges, at least a spring and a damper being arranged between the plates. The device further comprises a connector arranged its series on the upper plate so as to pivot about a horizontal axis perpendicular to the axis of the hinges. The insulating system comprises a plurality of devices operating in parallel and oriented in such a way that the transverse axes thereof (defined by the hinges) converge onto a vertical axis that contains the center of gravity of the structure or equipment being insulated, in particular against high-intensity seismic activity with large displacements.

12 Claims, 8 Drawing Sheets

(58) Field of Classification Search
USPC .............. 267/140.3, 140.4, 141, 141.1,
141.2,267/141.3, 141.4, 141.5, 141.6,
141.7
See application file for complete search history.

(56) References Cited

FOREIGN PATENT DOCUMENTS

| SU | 1257320 | * | 9/1986 | .............. F16F 15/06 |
| WO | WO 02/090681 | * | 11/2002 | ............... E04B 1/98 |

* cited by examiner

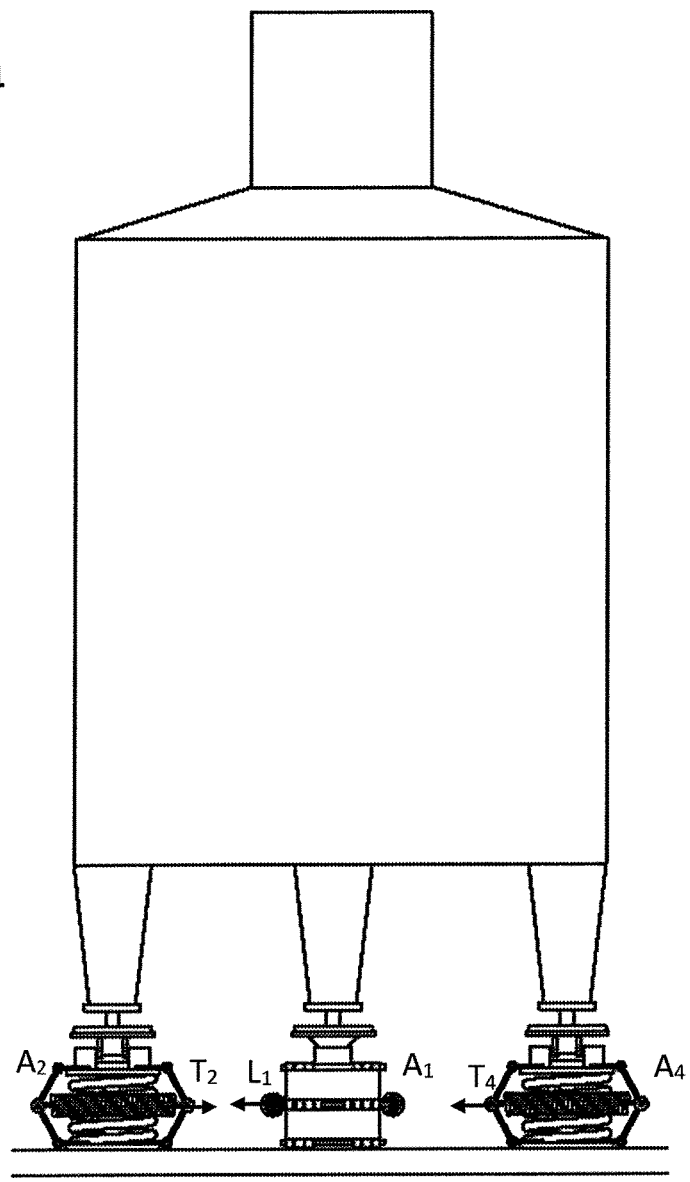
Fig. 2.1

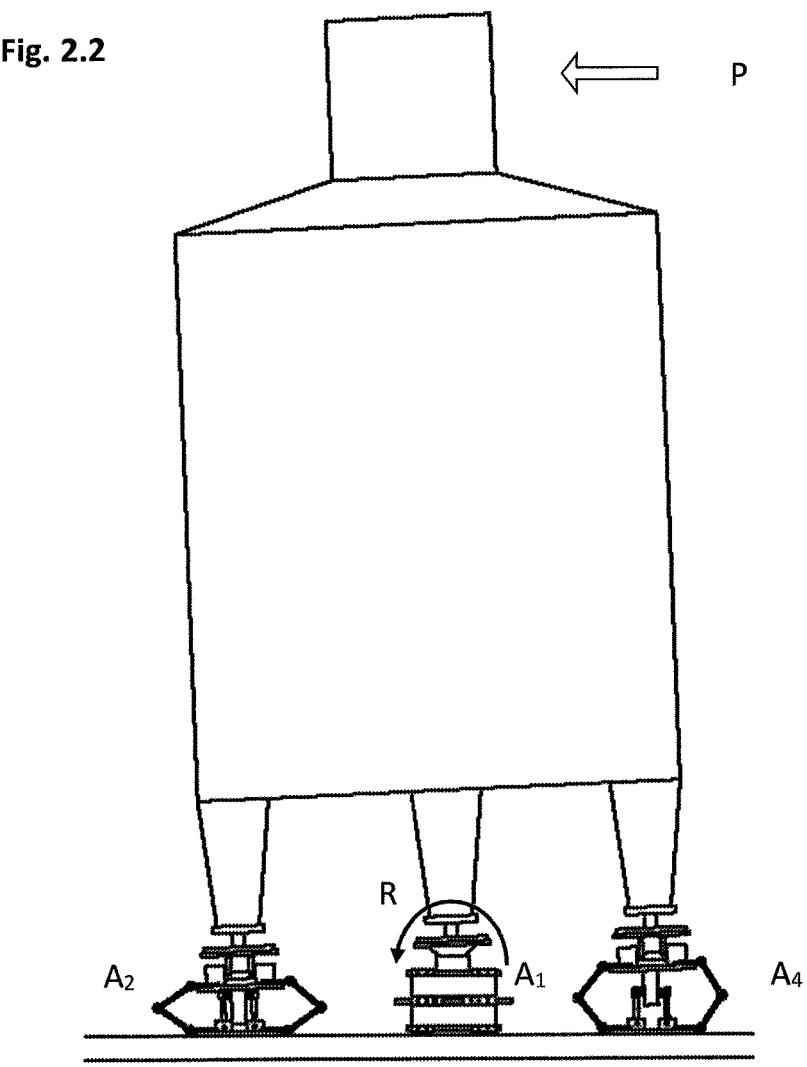

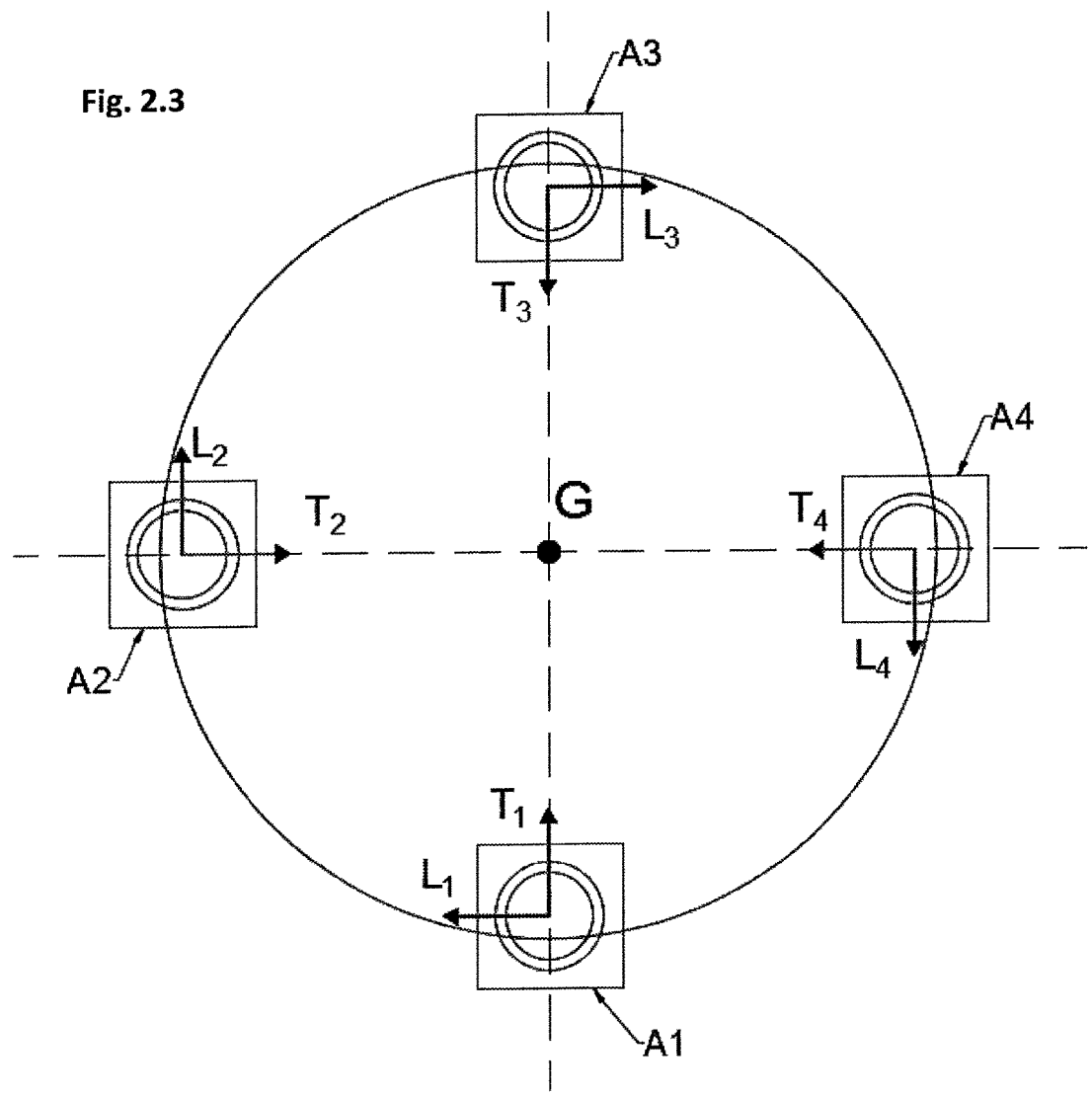
Fig. 2.3

Fig. 3.1 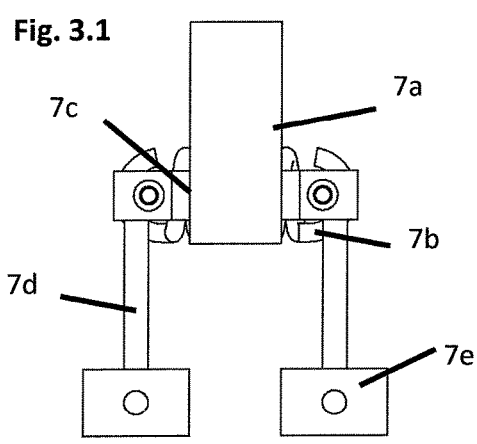
Fig. 3.2 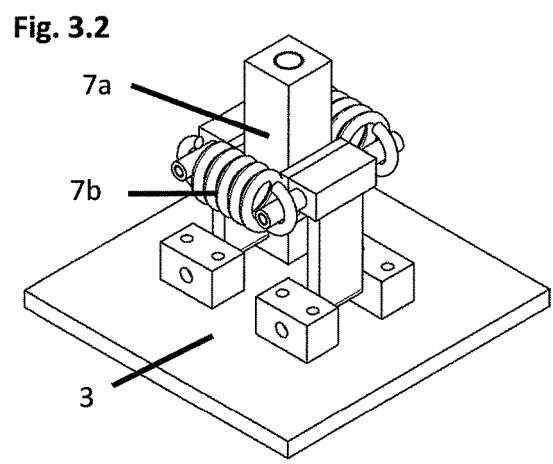

Fig. 4.1
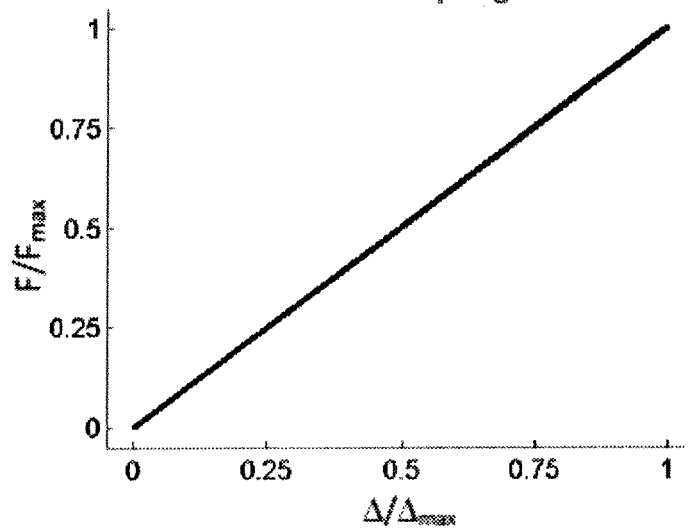
a) Main Spring
Fig. 4.2
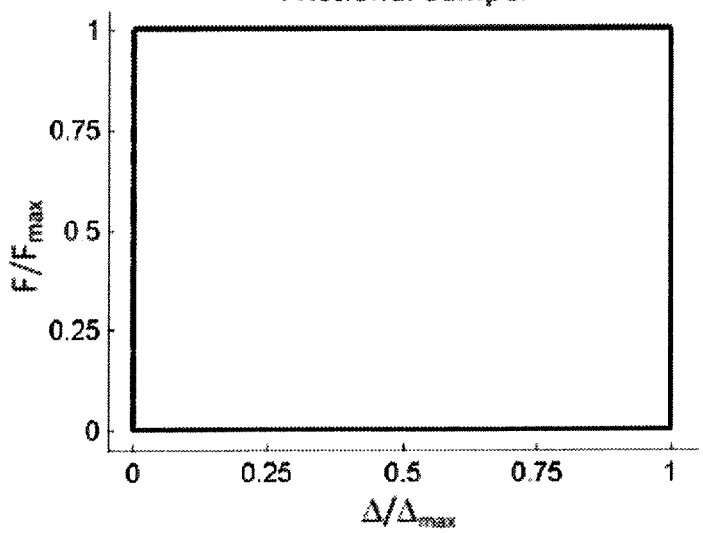
b) Dissipator by Friction

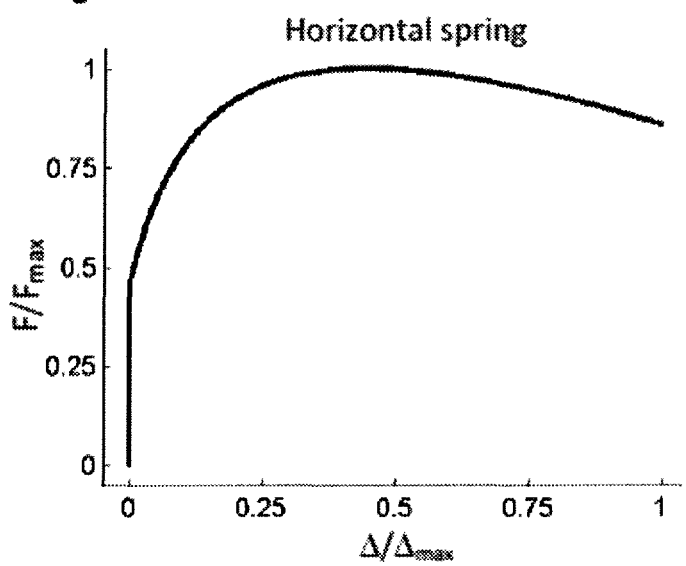
c) Secondary Spring
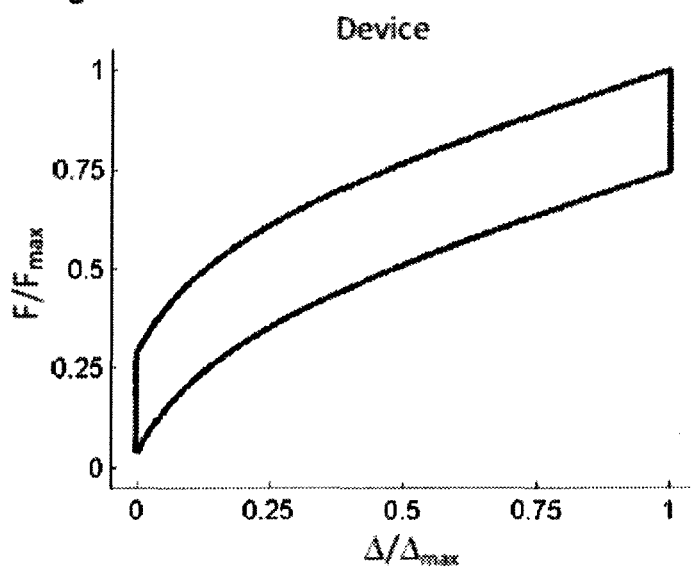

VIBRATION-INSULATING DEVICE AND SYSTEM

This application is a 371 of International Application PCT/CL2013/000016 filed 26 Feb. 2013 entitled "Vibration-Insulating Device And System", which was published on 6 Sep. 2013 with International Publication Number WO 2013/127018, and which claims priority from Chilean Application No. 552-2012 filed 29 Feb. 2012, the contents of which is incorporated herein by reference.

FIELD OF THE INVENTION

The present invention refers to a generic device for three-dimensional insulation of vibrations in structures and industrial equipment in general. The device is designed to reduce vibrations of medium and large intensity, such the ones originated by transit of vehicles, machinery, wind and earthquakes, with special application in the seismic insulation of structures and equipment with discrete supports and for use together with other equal or similar devices, thus forming a three-dimensional vibration insulation system.

STATE OF THE ART

In general all equipment and structures are constantly subject to vibrations coming from the surroundings. This becomes more relevant when it pertains to specialized equipment of high value in itself or because of its content and moreover when it pertains to non-expected vibrations such as wind, machinery, transit of vehicles (small vibrations) or earthquakes of low or even large intensity (high vibrations).

A great variety of devices used for the insulation of vibrations produced by machinery or transit of vehicles over structures and industrial equipment are known, like for example elastomeric supports, pneumatic devices, circular arc devices, among other (e.g. Barry Controls, Korfund Dynamics). These devices essentially consist of flexible vertical supports, capable of absorbing vibrations and dissipating energy. However, they are designed to absorb vertical deformations not larger than 50 mm in amplitude. This value is much smaller than the maximum deformation required by an earthquake of great magnitude, where deformations of between 100 mm and 300 mm of amplitude are reached.

Elastomeric insulators and frictional pendulum insulators are commonly used, among other devices, for the insulation of lateral (horizontal) vibrations, mainly used in large structures such as buildings, which consist essentially of laterally flexible and vertically stiff structural elements, as compared to the ones mentioned above which are vertically flexible, therefore significantly attenuating the horizontal vibrations, though not the vertical ones.

On the other hand, for three-dimensional seismic insulation, that is, for both vertical and lateral movements, systems that use vertical helical compression springs and viscous dampers are known (e.g. Base Control System by the firm GERB S.A.), over which the structure to insulate is supported, in general, the GERB-BCS system can reach reductions of seismic response comparable to the lateral insulation systems. Nevertheless, it presents some limitations, which have made them difficult to use. For example, the helical compression springs and the viscous dampers are not integrated into a single device, but are completely independent. Another limitation is their higher cost in relation to the lateral insulation devices.

Therefore, it is an object of the invention to develop a generic device for three-dimensional reduction of vibrations in structures and industrial equipment in general, capable of absorbing from medium to high vertical vibrations of up to 300 mm, of compact and integrated design and of low cost.

Another object of the invention is to obtain a practical solution that may constitute a system applicable to three-dimensional insulation of vibrations of structures and industrial equipment with discrete supports, for which some restrictions prevail such as: a) space limitations, as the device must be installed under the supports; b) a need for high dissipation of energy; c) a great deformation capability; and d) low cost. Among the aforementioned variables, the energy dissipation and deformation capability are the two main ones since when modified it is possible to control that the displacements remain under acceptable ranges both for the structure and the device, without the system losing any efficiency.

SUMMARY OF THE INVENTION

With the purpose of achieving the expressed objectives, a device has been developed for vibration insulation between a structure or equipment and the foundations thereof, the device basically consisting of a frame of six articulated metal plates of typically between 5 mm and 10 mm of thickness each, which configure the faces of the mantle of an hexagonal prism that is supported on one of its faces (lower face) on the foundations while the opposite face (upper face) faces the structure or equipment. These plates are connected to each other by means of metal hinges or similar means, forming a mechanism with three degrees of freedom: (i) displacement in the vertical axis; (ii) displacement in the transverse axis (the horizontal axis which is perpendicular to the hinges); and (iii) rotation about the longitudinal axis (the horizontal axis which is parallel to the hinges). The three degrees of freedom are restricted, these restrictions being: (i) the displacement along the longitudinal axis; (ii) the rotation about the transverse axis; and (iii) the rotation about the vertical axis. The following is a schematic table of the degrees of freedom which the device has:

| Degrees of freedom | Condition |
| --- | --- |
| Vertical Displacement (V) | Free |
| Longitudinal Displacement (L) | Restricted |
| Transverse Displacement (T) | Free |
| Rotation about V | Restricted |
| Rotation about L | Free |
| Rotation about T | Restricted |

The lateral plates of the device enable to guide the displacement of the upper plate by the effect of the structure's own weight and the vibrations and at the same time they restrict the displacement along the longitudinal axis and the rotation about the transverse axis. The affixation of the lower plate to the substrate or foundations provides the restriction of rotation about the vertical axis.

The stiffness of the device is provided by one or more primary springs, which can be vertical direction compression springs and/or torsion springs, wherein the first ones are placed centered between the upper and lower plates and the second ones are located on the axes of the hinges. Further, the device may comprise one or more tensile secondary springs of horizontal direction which extend between the lateral plates of one and the other side of the device. The primary springs are the ones responsible for providing the basic stability of the device and providing the necessary flexibility for the device to work as an insulator of vibrations. The secondary springs are the ones responsible of controlling the deformation due to own weight and are optional depending on the operational needs.

Depending on the type of primary and secondary spring the device may be arranged in 4 different configurations, according to the type of spring, and in one of the configurations it can even have no secondary spring. The following table shows these 4 configurations:

| Spring | Configuration 1 | Configuration 2 | Configuration 3 | Configuration 4 |
|---|---|---|---|---|
| Primary (it can not be missing) | vertical compressión sping(s) + torsion spring(s) | vertical compressión sping(s) | torsion spring(s) | torsion spring(s) |
| Secondary (could be missing) | horizontal tensile spring(s) | horizontal tensile spring(s) | horizontal tensile spring(s) | |

Further, the device comprises energy dissipation elements for damping the relative movement between the plates, which dampers can be hysteretic, either frictional or by metal yielding type, and/or they can be viscous-type energy dampers, which can be placed in vertical and/or horizontal direction, as they can also consist of torsion frictional dampers (e.g. friction washers). Specifically, the device may have one or more vertical axis dampers located between the upper and lower plates, one or more horizontal axis dampers located inside or on the contour of the frame, between the lateral plates of one side and the other side of the device, one or more torsion dampers located at the hinges or located on (at least) one pair of plates and connected to each other by a flexible element, or combinations thereof.

In a preferred embodiment of the invention the device includes: (i) a vertical helical compression spring, arranged centered on the device, connected to the upper plate and the lower plate of the frame; (ii) a pair of horizontal helical tensile springs, placed in the transverse direction, connecting each opposing pair of lateral plates of the frame; and (iii) a vertical direction friction damper, located in the interior of the vertical spring. Depending on economical and structural factors, the device may comprise more than one of these spring and damper arrangements.

The device of the present invention is designed to configure a system that has a set of devices for three-dimensional vibration insulation of a structure, wherein the number of devices is equal to the number of discrete supports of the structure. For the system to work correctly, it is sufficient for the structure to insulate to have 3 or more discrete supports and that each device is oriented so that the transverse axes of each one converge onto the vertical axis that passes through the centre of gravity of the structure, thereby achieving insulation in both vertical and lateral directions. Obviously in the case of axially symmetrical structures and with uniform distribution of its mass the centre of gravity coincides with the geometric centre. This type of tri-dimensional insulation has been denominated by the inventors "vertical-rotational insulation".

One important characteristic of the invention which allows to configure said three-dimensional insulation of vibrations is that the device incorporates a connecting element between the upper plate of the frame and the structure, wherein the connecting element is pivotable about a rotation axis parallel to the transverse axis of the device to allow rotations of the structure about said rotation axis. Preferably, the connector includes a support platform of the structure to insulate, mounted on an axle, flat ball joint or hinge. The support platform normally includes a metal plate with means for securely receiving the supports of the structure to insulate.

An advantage of the invention is that the deformation by own weight and other service loads, either static or dynamic, can be limited to relatively low values, of between 20 mm and 50 mm, depending on the user requirements, in turn, the device in conjunction with other ones and forming the mentioned vibration insulation system is capable of providing three-dimensional seismic insulation for earthquakes of high intensity, being able to reach deformations of up to 300 mm without blocking, and maintaining unaltered its elastic properties and energy dissipation capability.

The vibration insulation system can be used in tanks for storage of fluids (wine, oil, diary), process tanks (fermentation, extraction, separation), industrial equipment and high precision equipment (e.g. medical use, telescopes), among other uses.

DESCRIPTION OF THE FIGURES

To facilitate the understanding of the precedent ideas, the object of the invention is hereinafter described with reference to the accompanying illustrative drawings.

FIGS. 2.1 to 2.3 represent the assembly of 4 devices like the ones of FIG. 1, without showing the horizontal tensile springs for better clarity, the devices being arranged on a liquid storage tank of 4 legs, thus forming an example of vibration insulation system according to the invention.

FIGS. 3.1 to 3.2 respectively represent an elevation view and an isometric view of an energy damper according to a preferred embodiment of the invention.

FIGS. 4.1 to 4.4 show the theoretical results of tests with the device of FIG. 1.

DETAILED DESCRIPTION OF THE INVENTION

Figure 1:
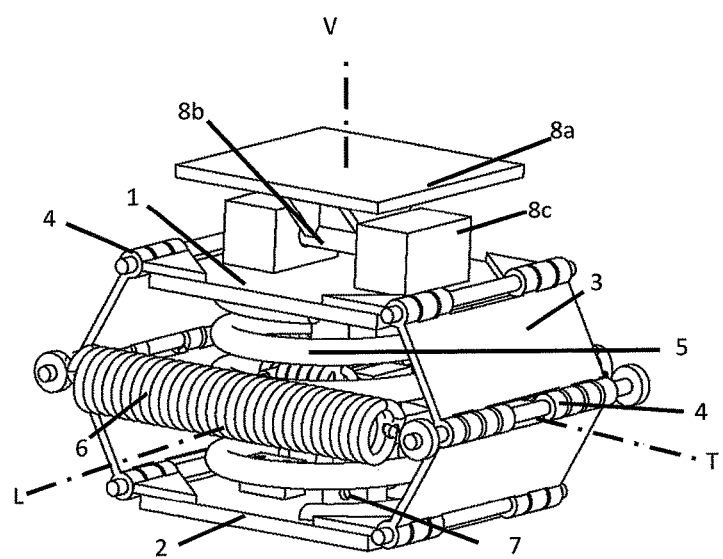
FIG. 1 represents an isometric view of a preferred embodiment of the generic insulation vibration device of the invention showing the different elements that make it up.

The following elements are distinguished with reference to the figures:
1. Lateral plate
2. Upper plate
3. Lower plate
4. Hinge
5. Vertical compression spring
6. Horizontal tension spring
7. Energy damper
   7a Friction bar
   7b Metal post
   7c Brake shoe
   7d Tensile spring of the energy damper
   7e Pivot axis of the posts
8. Connector
   8a Support platform
   8b Axis of the connector
   8c Rotational support of the axis of the connector
V vertical axis
T transverse axis L longitudinal axis
G vertical axis that passes through the centre of gravity As shown in FIG. 1, the device of the invention can be broken down into four parts. The first one is the central core of the device, comprised of the upper (1) and lower (2) plates, the vertical compression spring (5) and the energy damper (6). The second part is the movement guidance and restriction mechanism comprised of the lateral plates (3), which are connected to each other and with the upper and lower plates by means of hinges (4); this guidance mechanism restricts the displacement in the direction of the longitudinal axis L and the rotation about the transverse axis T. The third part, which is optional, is comprised of the two horizontal tensile springs (6), which connect the lateral plates (3) at the mid plane of the device. Finally, the fourth part is formed by a connector (8), which in this case is constituted by a support platform (8*a*) pivotally joined to the upper plate (1) by an axis (8*b*) supported on a pair of springs (8*c*). In summary, the first three parts of the device constitute the insulation mechanism itself and the fourth part is the connecting mechanism between the device and the structure.

The vibration insulation system according to the invention illustrated in FIGS. 2.1 to 2.3 is an illustrative example of how a set of four vibration insulation devices according to the invention for a structure, in this case a liquids containment cylindrical tank with four legs, can be arranged and can act in cooperative manner. The four vibration insulation devices (A1, A2, A3, A4) are arranged on the supports of the liquids tank in such a way that the transverse axes (T1, T2, T3, T4) of each device converge onto the vertical axis (G) that passes through the centre of gravity of the structure, in this case coincident with the vertical axis of symmetry of the cylindrical tank, while the longitudinal axes (L1, L2, L3, L4) of the devices are in a direction tangent to the ground plan of the tank.

In FIG. 2.1 the system is in a state of equilibrium, with the vertical springs pre-compressed by the effect of the empty tank's own weight. When a lateral force (P) is applied to the tank, now full of liquid, as shown in FIG. 2.2, the vertical compression springs of the second device (A2) and fourth device (A4) work together, deforming (FIG. 2.2) as the upper plate of the second device (A2) is displaced downwards and the upper plate of the fourth device (A4) is displaced upwards and at the same time rotate with respect to the longitudinal axes (L2, L4), and a rotation (R) is generated of the connectors of the first device (A1) and the third device (A3), and therefore of the tank. The vertical springs of the first and third devices (A1, A3) in FIG. 2.2 remain compressed solely by the effect of the tank's own weight and of the liquid they contain. Naturally, the horizontal tensile springs (not shown) deform correspondingly.

Forming part of the main components of the insulator is the energy damper (7). In a preferred embodiment of the invention illustrated in FIGS. 3.1 and 3.2 the energy damper is a friction mechanism that is installed inside the vertical spring (5) and comprises a metal friction bar of prismatic cross-section (7*a*) that is connected to the upper plate (1) and it brushes against brake shoes (7*c*) arranged in the end of pivotable metal posts (7*d*). The friction force is controlled by means of the pre-tensioning of two tensile springs (7*b*) which act thanks to the post's pivoting capability. This allows generation of a friction force of constant magnitude, dissipating energy as the device vertically deforms. Therefore, it is possible to modify the equivalent damping of the system by changing the stiffness or pre-tension of the springs.

Test Results

FIGS. 4.1 to 4.4 show in a schematic way the theoretical components of the force-deformation relation of the exemplary device of FIG. 1. The contributions of the primary (vertical) spring, of the friction force in the energy damper and of the secondary (horizontal) spring are presented in FIGS. 4.1 to 4.3. The total force of the device is presented in FIG. 4.4. It should be noted that for deformations of up to 12.5% of the maximum deformation, the horizontal spring contributes with more stiffness than the vertical spring, while for larger deformations this relation is inverted. It is important to mention that similar force-deformation relations can be obtained with helical torsion springs.

Figure 5:
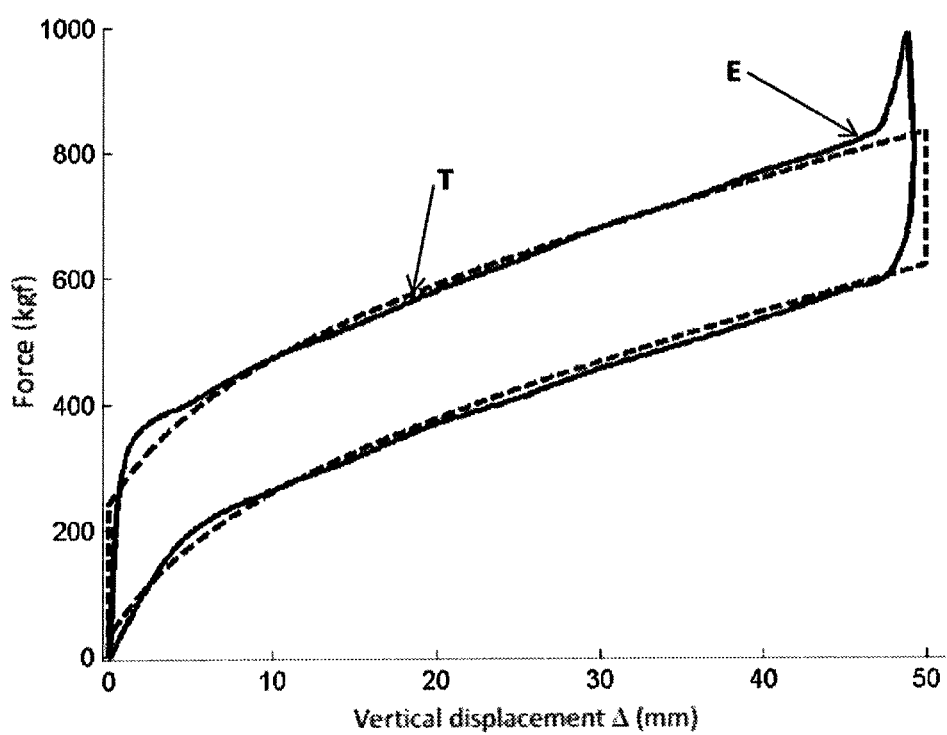
FIG. 5 shows the results of cyclic compression tests with the system of FIG. 3.

The prototype previously described as exemplary embodiment of application that FIGS. 2.1 to 2.3 show was tested in laboratory tests, obtaining the results shown in FIG. 5 where the force-deformation curves obtained are presented both experimentally (E) and analytically (T) through a finite elements model of the device, it can be appreciated that a vertical load of approximately 1000 kgf and a vertical tangent stiffness of approximately 9.25 kgf/mm are reached. The maximum vertical force that is observed at the end of the load cycle is due to the device being tested until the vertical frictional damper reached a maximum deformation of 50 mm. Since the model is scalable, this same design taken to real scale would reach a maximum deformation of up to 300 mm. Note that the energy dissipation by friction is very significant, reaching a damping factor equivalent to a approximately 30%.

Although the description that is herein made pertains to a exemplary embodiment of the invention applied to a tank of liquids, it will be obvious to an expert in the field that the device can be used in other applications and even be used directly without connector in structures with continuous supports.

The invention claimed is:

1. Device for three-dimensional vibration insulation between structures or industrial equipment in general and the foundations thereof, in particular structures or equipment with discrete supports, the device to be used together with two or more of other similar devices on equal number of discrete supports of the structure or equipment, characterized in that said device comprises:
   an insulation mechanism comprised of:
      a frame of six metal plates, an upper horizontal one, a lower horizontal one and two pairs of inclined lateral plates at each side, which configure the mantle of an hexagonal prism supported on one of its faces on the foundations, the plates are connected by hinges or other connectors forming a mechanism with three degrees of freedom: (i) displacement in the vertical direction; (ii) displacement in the direction transverse to the line of connection of the plates; and (iii) rotation about an axis along the line of connection of the plates, the three degrees of freedom being restricted, (i) with respect to displacement along the line of connection of the plates; (ii) with respect to rotation about an axis; transverse to the line of connection of the plates and (iii) with respect to rotation about an axis in the vertical direction;
      at least one spring arranged for limiting the relative movement of the plates; and
      at least one energy damper for damping the relative movement of the plates; and
   a connecting element between the insulation mechanism and the structure or equipment, arranged on the upper plate so as to pivot about a rotation axis parallel in direction to the transverse axis of the device, the transverse axis being defined as the horizontal axis perpendicular to the hinges.

2. The device of claim 1, characterized in that said at least one spring comprises one or more vertical direction compression spring located between the upper and lower plates, or at least one torsion spring arranged between the lateral plates of one side of the device and the lateral plates of the other side of the device, or a combination thereof.

3. The device of claim 1, characterized in that the at least one energy damper is hysteretic or viscous type damper.

4. The device of claim 3, characterized in that the hysteretic energy damper is a friction or metal yielding damper.

5. The device of claim 3, characterized in that the energy damper is a vertical axis damper located between the upper and lower plates.

6. The device of claim 3, characterized in that said at least one spring comprises one or more vertical direction compression spring and said energy damper is located in the interior of at least one vertical direction compression spring.

7. The device of claim 4, characterized in that the frictional energy damper is a torsion damper, arranged on the axes of the hinges or located on at least one pair of plates and connected to each other by a flexible element.

8. The device of claim 3, characterized in that at least one energy damper is a horizontal axis damper and extends inside or on the contour of the frame between the lateral plates of one side of the device and the lateral plates of the other side of the device.

9. The device of claim 5, characterized in that said device additionally includes one or more, horizontal axis damper and torsion dampers.

10. The device of claim 4, characterized in that the energy damper comprises a metal friction bar of prismatic cross-section connected to the upper plate and brushable against brake shoes arranged at the end of pivotable metal posts, and two horizontal direction tensile springs which extend between the posts externally to the friction bar.

11. The device of claim 1, characterized in that the connector includes a support platform for the structure to insulate, mounted on, pivot flat ball joint or hinge.

12. A system for three-dimensional vibration insulation between structures or industrial equipment in general and the foundations thereof, in particular structures or equipment with discrete supports, characterized in that said system comprises three or more devices according to claim 1 on equal number of supports of the structure or equipment, each device arranged with its transverse axis converging onto the vertical axis that passes through the centre of gravity of the structure or equipment.

* * * * *